(12) United States Patent
Blum et al.

(10) Patent No.: US 7,205,903 B2
(45) Date of Patent: Apr. 17, 2007

(54) INTERACTIVE AND DYNAMIC ELECTRONIC FLOOR ADVERTISING/MESSAGING DISPLAY

(75) Inventors: Ronald D. Blum, Roanoke, VA (US); William Kokonaski, Gig Harbor, WA (US); Dwight P. Duston, Laguna Niguel, CA (US)

(73) Assignee: Intellimat, Inc., Roanoke, VA (US)

( * ) Notice: Subject to any disclaimer, the term of this patent is extended or adjusted under 35 U.S.C. 154(b) by 113 days.

(21) Appl. No.: 10/759,167

(22) Filed: Jan. 20, 2004

(65) Prior Publication Data

US 2004/0217876 A1    Nov. 4, 2004

Related U.S. Application Data

(63) Continuation-in-part of application No. 10/682,435, filed on Oct. 10, 2003, now Pat. No. 6,917,301, which is a continuation-in-part of application No. 10/438,923, filed on May 16, 2003, now Pat. No. 6,982,649, which is a continuation-in-part of application No. 10/285,639, filed on Nov. 1, 2002, now Pat. No. 6,873,266, which is a continuation of application No. 10/137,357, filed on May 3, 2002, now Pat. No. 6,507,285, which is a continuation of application No. 09/767,846, filed on Jan. 24, 2001, now Pat. No. 6,417,778, which is a continuation of application No. 09/418,752, filed on Oct. 15, 1999, now abandoned, which is a continuation-in-part of application No. 09/304,051, filed on May 4, 1999, now Pat. No. 6,219,876.

(60) Provisional application No. 60/441,408, filed on Jan. 22, 2003.

(51) Int. Cl.
    *G08B 5/00* (2006.01)

(52) U.S. Cl. .................. 340/815.4; 340/555; 340/600; 340/666; 705/14

(58) Field of Classification Search ............. 340/815.4, 340/691.6, 541, 555, 567, 666, 539.22; 345/204, 345/207, 30, 55; 705/14
See application file for complete search history.

(56) References Cited

U.S. PATENT DOCUMENTS 2,191,704 A    2/1940  Bennett (Continued)

FOREIGN PATENT DOCUMENTS

DE          3 147 113       6/1983

(Continued)

OTHER PUBLICATIONS

Protective Products Advertisement.

(Continued)

*Primary Examiner*—Thomas Mullen
(74) *Attorney, Agent, or Firm*—Alston & Bird LLP

(57) ABSTRACT

Embodiments of the present invention relate to a floor display system comprising a floor covering and an electronic display device associated with the floor covering. The electronic display device is able to display electronically modifiable arbitrary content. The floor display system further comprises a controller and a sensing device coupled to the controller. The sensing device is associated with a specific location on the display device and generates a signal to the controller to cause a content of a display of the display device to be modified or newly generated at the specific location.

54 Claims, 13 Drawing Sheets

U.S. PATENT DOCUMENTS

| | | |
|---|---|---|
| 2,254,830 A | 9/1941 | Schloss |
| 2,282,672 A | 5/1942 | Nelson |
| 2,512,310 A | 6/1950 | Corson |
| 2,800,215 A | 7/1957 | Converse |
| 2,843,868 A | 7/1958 | Borgstorm |
| 2,919,456 A | 1/1960 | Spivey |
| 3,078,490 A | 2/1963 | Etcher |
| 3,083,393 A | 4/1963 | Nappi |
| 3,141,522 A | 7/1964 | Fitzpatrick |
| 3,183,116 A | 5/1965 | Schaar |
| 3,300,275 A | 1/1967 | Lorman |
| 3,400,421 A | 9/1968 | Nappi et al. |
| 3,435,481 A | 4/1969 | Kessler |
| 3,501,797 A | 3/1970 | Nappi |
| 3,517,407 A | 6/1970 | Wyant |
| 3,578,738 A | 5/1971 | Hughes |
| 3,663,980 A | 5/1972 | Conklin |
| 3,665,543 A | 5/1972 | Nappi |
| 3,696,459 A | 10/1972 | Kucera et al. |
| 3,699,926 A | 10/1972 | Stockl |
| 3,717,897 A | 2/1973 | Amos et al. |
| 3,785,102 A | 1/1974 | Amos |
| 3,886,620 A | 6/1975 | Miller |
| 3,906,578 A | 9/1975 | Huber |
| 3,909,996 A | 10/1975 | Ettlinger, Jr. et al. |
| 3,916,401 A | 10/1975 | Freeman |
| 3,930,084 A | 12/1975 | Shields .................. 428/67 |
| 4,107,811 A | 8/1978 | Imsande |
| 4,126,854 A | 11/1978 | Sheridon |
| 4,143,103 A | 3/1979 | Sheridon |
| 4,143,194 A | 3/1979 | Wihksne |
| 4,328,275 A | 5/1982 | Vargo |
| 4,353,944 A | 10/1982 | Tarui |
| 4,421,809 A | 12/1983 | Bish et al. |
| 4,435,451 A | 3/1984 | Neubert |
| 4,439,474 A | 3/1984 | Sagel |
| 4,482,593 A | 11/1984 | Sagel et al. |
| 4,484,250 A | 11/1984 | Rzepecki et al. |
| 4,559,250 A | 12/1985 | Paige |
| 4,564,546 A | 1/1986 | Jones |
| 4,576,244 A | 3/1986 | Zeigner et al. |
| 4,609,580 A | 9/1986 | Rockett et al. |
| 4,614,679 A | 9/1986 | Farrington et al. |
| 4,660,828 A | 4/1987 | Weiss ..................... 482/123 |
| 4,665,342 A | 5/1987 | Topp et al. .................. 313/505 |
| 4,707,895 A | 11/1987 | Lang |
| 4,720,789 A | 1/1988 | Hector et al. |
| 4,752,114 A | 6/1988 | French ..................... 350/96.24 |
| 4,798,754 A | 1/1989 | Tomek |
| 4,822,669 A | 4/1989 | Roga |
| 4,853,678 A | 8/1989 | Bishop, Jr. et al. |
| 4,917,975 A | 4/1990 | DeGuzman |
| 4,959,265 A | 9/1990 | Wood |
| 4,974,857 A | 12/1990 | Beall et al. .................. 273/371 |
| 5,018,235 A | 5/1991 | Stamatiou |
| 5,071,628 A | 12/1991 | Alazet |
| 5,142,733 A | 9/1992 | Mogez |
| 5,161,041 A | 11/1992 | Abileah et al. ............... 359/40 |
| 5,204,159 A | 4/1993 | Tan |
| 5,293,660 A | 3/1994 | Park |
| 5,335,788 A | 8/1994 | Beasley et al. |
| 5,344,693 A | 9/1994 | Sanders |
| 5,460,381 A | 10/1995 | Smith et al. .................. 273/238 |
| 5,461,748 A | 10/1995 | Koiduka |
| 5,500,267 A | 3/1996 | Canning |
| 5,556,685 A | 9/1996 | Swicegood, Jr. |
| 5,561,446 A | 10/1996 | Montlick .................. 345/173 |
| 5,562,580 A | 10/1996 | Beasley et al. |
| 5,571,626 A | 11/1996 | Cumming et al. |
| 5,589,246 A | 12/1996 | Calhoun |
| 5,604,027 A | 2/1997 | Sheridon |
| 5,620,003 A * | 4/1997 | Sepponen .................. 600/527 |
| 5,646,818 A | 7/1997 | Hahn .................. 361/681 |
| 5,658,637 A | 8/1997 | Volz |
| 5,703,564 A | 12/1997 | Begum et al. ............... 340/539 |
| 5,723,204 A | 3/1998 | Stefik |
| 5,747,133 A | 5/1998 | Vinod et al. .................. 428/46 |
| 5,805,117 A | 9/1998 | Mazurek et al. ............... 345/1 |
| 5,815,995 A | 10/1998 | Adam |
| 5,816,550 A | 10/1998 | Watanabe et al. ...... 248/222.11 |
| 5,826,874 A | 10/1998 | Teitell et al. |
| 5,839,976 A | 11/1998 | Darr |
| 5,848,830 A | 12/1998 | Castle et al. ................. 362/84 |
| 5,869,350 A | 2/1999 | Heeger et al. |
| 5,885,684 A | 3/1999 | Hefner et al. ................. 428/89 |
| 5,886,474 A | 3/1999 | Asai et al. ................. 315/169.1 |
| 5,913,727 A | 6/1999 | Ahdoot ........................ 463/39 |
| 5,945,502 A | 8/1999 | Hsieh et al. |
| 5,971,761 A | 10/1999 | Tillman, Sr. ................. 434/81 |
| 6,010,429 A | 1/2000 | Prueitt |
| 6,084,526 A | 7/2000 | Blotky et al. |
| 6,219,876 B1 | 4/2001 | Blum |
| 6,233,776 B1 | 5/2001 | Blum et al. |
| 6,247,650 B1 | 6/2001 | Vachette et al. ............. 235/487 |
| 6,378,925 B1 | 4/2002 | Greenlee .................... 294/171 |
| 6,417,778 B2 | 7/2002 | Blum et al. |
| 6,615,526 B2 | 9/2003 | Pitcher et al. |
| 6,617,530 B1 * | 9/2003 | Lin ........................ 177/25.16 |
| 6,641,139 B2 | 11/2003 | Lamberti et al. |
| 6,914,540 B2 | 7/2005 | Gongolas |
| 6,963,035 B2 * | 11/2005 | Honda et al. ............ 177/25.19 |
| 2001/0011399 A1 | 8/2001 | Blum et al. |
| 2003/0066073 A1 * | 4/2003 | Rebhn ........................ 725/12 |
| 2004/0004827 A1 | 1/2004 | Guest |

FOREIGN PATENT DOCUMENTS

| | | |
|---|---|---|
| DE | 87 01 817.9 | 4/1987 |
| DE | 3 923 959 | 10/1990 |
| DE | 3 915 254 | 11/1990 |
| DE | 40 06 781 | 9/1991 |
| DE | 298 11 821 | 10/1998 |
| EP | 0 009 891 | 4/1980 |
| EP | 0 188 005 | 7/1986 |
| EP | 0 199 537 | 10/1986 |
| EP | 0 202 846 | 11/1986 |
| EP | 0 353 139 | 1/1990 |
| EP | 0 354 281 | 2/1990 |
| EP | 0 359 478 | 3/1990 |
| EP | 0 365 869 | 5/1990 |
| EP | 0 374 860 | 6/1990 |
| EP | 0 421 258 | 4/1991 |
| EP | 0 448 768 | 10/1991 |
| EP | 0 512 904 | 11/1992 |
| EP | 0 514 191 | 11/1992 |
| EP | 0 554 641 | 8/1993 |
| EP | 0 573 277 | 12/1993 |
| EP | 0 624 125 | 11/1994 |
| EP | 0 624 681 | 11/1994 |
| EP | 0 648 834 | 4/1995 |
| EP | 0 721 176 | 7/1996 |
| EP | 0 751 213 | 1/1997 |
| EP | 0 794 244 | 9/1997 |
| EP | 0 839 900 | 5/1998 |
| EP | 0 895 745 | 2/1999 |
| EP | 0 971 064 | 1/2000 |
| FR | 2 532 095 | 2/1984 |
| GB | 319 416 | 9/1929 |
| GB | 433 133 | 8/1935 |
| GB | 2 182 242 | 5/1987 |
| JP | 4 144 532 | 5/1992 |
| JP | 06-090891 | 4/1994 |
| JP | 6 189 890 | 7/1994 |
| JP | 08-239988 | 9/1996 |

| | | |
|---|---|---|
| JP | 10-057728 | 3/1998 |
| JP | 11-109901 | 4/1999 |
| JP | 2000-105558 | 4/2000 |
| JP | 2002-00059 | 7/2000 |
| WO | WO 91/08701 | 6/1991 |
| WO | WO 93/20536 | 10/1993 |
| WO | WO 00/07811 | 2/2000 |
| WO | WO 00/16682 | 3/2000 |
| WO | WO 00/79871 | 4/2000 |
| WO | WO 00/29209 | 5/2000 |
| WO | WO 01/27909 | 4/2001 |
| WO | WO 02/11110 | 2/2002 |
| WO | WO 02/22972 | 3/2002 |
| WO | WO 02/065451 | 8/2002 |
| WO | WO 02/100094 A2 | 12/2002 |

OTHER PUBLICATIONS

Sole-Parmer Advertisement.

3m Clean-Welk Mat, 5800 Series, Technical Data, Jul. 1995.

Advertising Materials for Alma (Advanced Laminated Material Applications, Inc.) ClenStep Contamination Control Mat, 12 pages, 1999.

*Displaying a Winning Glow*, Michael Kenward, Technology Review, Jan./Feb. 1999, vol. 102, No. 1, 7 pages.

*Screen Saviors*, Michael Mattis, Business 2.0, Jul. 1999, 1 page.

*What's New, Intelligent Ink*, Advertising Material, Popular, 1 page, no date.

*Electronic Ink*, Glen Sanders, ebooknet.com, 2 pages, Sep. 20, 1999.

MMR Journal, *Floor Decals New Wrinkle in P-O-P Ads*, vol. 16, No. 10, p. 13, Apr. 5, 1999, USA.

Philadelphia Enquirer, *Cherry Hill, N.J., Firm Wants You To Look Down On Its Ads*, Regional Newspaper, Aug. 27, 1998, USA.

*Floor Graphics*, advertisements, copyright 2002.

U.K. Patent Office Search Report dated May 28, 2003.

Patent Abstracts of Japan, vol. 1995, No. 05, Jun. 30, 1995 & JP 07 036395 A (Toray Ind Inc), Feb. 7, 1995.

Patent Abstracts of Japan, vol. 1997, No. 01, Jan. 31, 1997 & JP 08 239988 (Meitaku Syst:KK), Sep. 17, 1996.

Patent Abstracts of Japan, vol. 2002 & JP 2002 062832 A (Nippon Signal Co Ltd: The), Feb. 28, 2002.

Patent Abstracts of Japan, vol. 1995, No. 01, Feb. 28, 1995 & JP 06 299682 A (Jiyonsuton:KK), Oct. 25, 1994.

Co-pending U.S. Appl. No. 10/373,191, filed Feb. 26, 2003.

Co-pending U.S. Appl. No. 10/438,923, filed May 16, 2003.

Co-pending U.S. Appl. No. 10/454,631, filed Jun. 5, 2003.

Co-pending U.S. Appl. No. 10/682,435, filed Oct. 10, 2003.

Co-pending U.S. Appl. No. 10/759,167, filed Jan. 20, 2004.

\* cited by examiner

INTERACTIVE AND DYNAMIC ELECTRONIC FLOOR ADVERTISING/MESSAGING DISPLAY

This application claims the benefit under 35 U.S.C. § 119(e) of U.S. provisional application Ser. No. 60/441,408, filed Jan. 22, 2003. Moreover, this application is a continuation-in-part of application Ser. No. 10/682,435, filed Oct. 10, 2003, and now U.S. Pat. No. 6,917,301, issued Jul. 12, 2005. Application Ser. No. 10/682,435 is a continuation-in-part of application Ser. No. 10/438,923, filed May 16, 2003, and now U.S. Pat. No. 6,982,649, issued Jan. 3, 2006. Application Ser. No. 10/438,923 is a continuation-in-part of application Ser. No. 10/285,639, filed Nov. 1, 2002, and now U.S. Pat. No. 6,873,266, issued Mar. 25, 2005, which is a continuation of application Ser. No. 10/137,357, filed May 3, 2002, and issued as U.S. Pat. No. 6,507,285 on Jan. 14, 2003. Application Ser. No. 10/137,357 is a continuation of application Ser. No. 09/767,846, filed Jan. 24, 2001, and issued as U.S. Pat. No. 6,417,778 on Jul. 9, 2002. Application Ser. No. 09/767,846 is a continuation of application Ser. No. 09/418,752, filed Oct. 15, 1999, and now abandoned. Application Ser. No. 09/418,752 is a continuation-in-part of application Ser. No. 09/304,051, filed May 4, 1999, and issued as U.S. Pat. No. 6,219,876 on Apr. 24, 2001. Each of the above-identified applications is fully incorporated herein by reference.

BACKGROUND

Advertising and other kinds of messaging are typically presented in forms that use "vertical space": that is, billboards, walls, ceiling-mounted displays, and the like. On the other hand, one kind of space that has great potential for advertising and messaging, but has been largely overlooked, is floor space, which may be characterized as "horizontal space."

There have been efforts to exploit floor space for advertising. Adhesive (i.e., "stick-on") floor decals are known. Such decals may include a colorful image and convey some kind of advertising message, such as "Drink Coke". Such an advertising medium is limited, however, by the fact that the message is static and not easily changed. On the other hand, U.S. Pat. No. 6,417,778, which is fully incorporated herein by reference, describes a modifiable electronic display associated with a floor that enables images and text to be easily changed, allowing an advertising message to be quickly adaptable and efficiently targeted toward desired customers.

Interactive features in a floor display system may increase its usefulness and commercial appeal. U.S. application Ser. No. 10/438,923 by Blum et al., filed May 16, 2003, for example, describes a floor display system including a number of interactive features for use in various commercial or other public applications. The present disclosure relates to a number of advantageous improvements and enhancements to such a floor display system.

DETAILED DESCRIPTION

Figure 1:
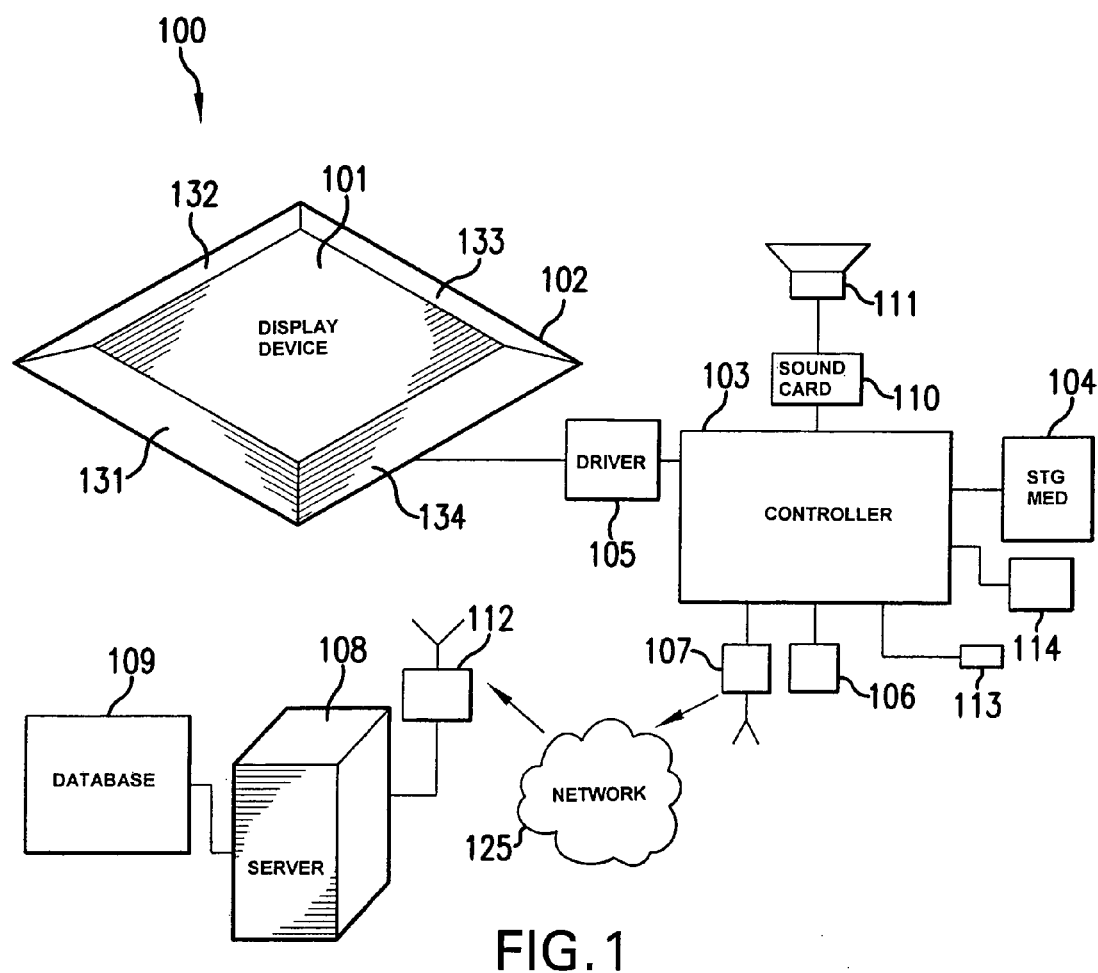
FIG. 1 shows a floor display system according to embodiments of the present invention.

Embodiments of the present invention relate to a floor display system. The floor display system may be arranged in a public place, such as a commercial establishment or other public building, and be configured to display electronically modifiable arbitrary content, such as advertising or other informational content. More specifically, the floor display system comprises a floor covering and an electronic display device associated with the floor covering. The electronic display device is able to display electronically modifiable arbitrary content. The floor display system further comprises a controller and a sensing device coupled to the controller. The sensing device is associated with a specific location on the display device and generates a signal to the controller to cause a content of a display of the display device to be modified or newly generated at the specific location. This enables eye-catching effects to be created on the display device, as described in more detail below, and consequently enhances the usefulness and commercial appeal of the floor display system.

As noted above, U.S. Pat. No. 6,417,778 discloses a system for electronically conveying information via a floor display. More specifically, the floor display may incorporate a modifiable electronic display surface presenting, for example, a liquid crystal display. The display could be connected to a computer and a computer generated image could be displayed on the display. Thus, the image displayed on the display could be modified by generating a different computer image and displaying that computer image on the display. The display could be associated with a base portion of a floor covering, such as included within a recess thereof, or could be included on a bottom surface, facing upward, of an insert portion of the floor covering. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or in combination.

Other alternatives for modifying graphics displayed on the floor covering include using light emitting polymers to create, and thus change, the graphics. The light emitting polymers can be either applied to, attached to, or woven into the floor covering. The light emitting polymers may be utilized on any portion of the floor covering, for example, on either the base portion or the insert portion, or on any other portion of the different embodiments for the floor covering. Light emitting polymers are known and described in U.S. Pat. Nos. 5,945,502, 5,869,350, and 5,571,626, which are incorporated herein by reference in their entirety.

Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer and thus, the World Wide Web by utilizing, for example, a Motorola paging system. Text on all displays, if multiple displays are used, can be changed at once by a single editor, through a Web page.

According to embodiments of the present invention, additional or alternative technologies to those described above may be used to implement a floor display system. "Floor" as used herein means floor, ground, or any surfaces thereof including concrete, asphalt, carpeting, wood, linoleum, tile, rubber, vinyl and the like. A floor display system 100 according to embodiments of the present invention is shown in FIG. 1. The floor display system 100 includes an electronic display device 101 associated with a floor covering 102. More specifically, the display device 101 may be at least partly connected to, supported by, received within or otherwise associated with the floor covering 102. The floor covering 102 and associated electronic display device 101 may take many structural forms and be constructed from various types of materials, and are not limited to the specific forms illustrated herein. In embodiments, the floor covering 102 and electronic display device 101 are designed to be used in places where there is foot traffic or other (for example, wheeled shopping cart) traffic. Accordingly, the floor covering and electronic display device may be sturdy and durable enough that they may be repeatedly stepped on, walked over, or have a wheeled shopping cart or other rolling or sliding object traverse them, with negligible adverse effect on the floor covering and display device. The electronic display device may have, for example, a sturdy protective covering that is transparent or semi-transparent to allow the electronic display device to be viewed therethrough, and that protects the electronic display device from damage associated with foot or other traffic, such as scratches, cracks, chips, tears, or damage caused by environmental dirt. The floor covering 102 may be affixed to a floor or may be portable so that it can be easily moved to different places.

The floor covering 102 could comprise a plurality of inclined surfaces 131, 132, 133 and 134 that slope downward and away from a top surface (which could be the surface of a protective covering of the display device 101, as described above) so that the entire perimeter of the floor covering presents an inclined surface to a person approaching the floor covering. Such a structure may make the floor covering easier to cross over, either by a person walking over the floor covering, or by a wheeled shopping cart, for example, if the floor covering is placed in the aisles of a commercial establishment.

The electronic display device 101 associated with the floor covering 102 may be configured to electronically display graphical images and alphanumeric data in either a static (not moving or changing) or dynamic (e.g., scrolling or otherwise moving or changing) format. More specifically, the electronic display device 101 may be coupled by wired or wireless means to a controller 103 and modifiable via the controller 103 to display any content chosen by a user. For example, as shown in FIG. 1, the electronic display device 101 may be coupled to the controller 103 via a display driver circuit such as a video graphics adapter card 105. The controller 103 may include any kind of electronic logic circuit: for example, a general microprocessor configurable with software, or an ASIC (application specific integrated circuit). The driver 105 of the electronic display device may be integrated with the controller 103 or built into an ASIC. The controller may also be in the form of a single board computer with a processor and memory and with one or more display driving circuits built onto the board, as well as wireless components for communicating with the outside world or for loading data into memory.

The controller may be coupled to a storage medium 104, which could be any form of medium suitable for storing digital data, including RAM (random access memory), ROM (read-only memory), flash or other non-volatile solid-state electronic storage, EEPROM (electronically erasable and programmable read only memory), or magnetic and/or optical disk storage. The storage medium 104 may store, for example, control software for execution by the controller 103 and video content of choice for display, under the control of the control software, on the electronic display device 101. A user interface (not shown), such as a personal computer with a display monitor and keyboard, may be coupled to the controller to enable configuration of the controller with specific user input, such as specific control programs to produce specific displays and/or audio output. An audio device 111 may further be coupled to the controller 103 via a sound card 110. The audio device 111 may output audio content of choice, stored in the storage medium 104, under the control of the controller 103. Components of the floor display system 100 may be powered by a power supply 114. The floor display system may further comprise a sensing device 113 to provide for a variety of interactive applications of the floor display system. The sensing device 113 could be coupled to the controller 103 and provide signals thereto. The connection of the sensing device to the controller could be wired or wireless.

Data may be stored in the storage medium 104 using, for example, a data port 106 coupled to a common system bus. The bus could be, by way of example only, a USB (Universal Serial Bus). The floor display system may further comprise a wireless port 107 implemented, for example, using a wireless WAN/LAN card. Through the wireless port 107, the floor display system 100 may be coupled to and communicate with a network 125. The network could be any kind of network, including a wide area network (WAN) such as the Internet, or a local area network (LAN) including, for example, other floor display systems. Through the network 125, the floor display system 100 may be coupled, for example, via a wireless communication device 112, to a server computer 108 of the network. The server computer 108 may be coupled to a database 109. The database 109 may store information relevant to operation of the floor display system 100. For example, the database may contain video and audio content or control software that is downloadable to the storage medium 104 of the floor display system. Thus, the floor display system 100 may be remotely controllable. However, the floor display system 100 need not be networked, and could be controlled locally by, for example, downloading content and control software locally via data port 106. Also, while wireless communication methods and systems are illustrated in FIG. 1, wired systems could also be used, or could be combined with wireless systems.

Display technologies that may be utilized in embodiments of the present invention, in addition to those described earlier, include: liquid crystal displays (LCDs), light-emitting diodes (LEDs), organic light-emitting diodes (OLEDs), plasma display panels (PDPs), field emission displays (FEDs) including printable field emitters, ferroelectric displays, nanocarbon displays, polymeric light emitting diodes (PLEDs), light emitting poiymers (LEPs), electronic paper, and light-emitting ceramic or other light-emitting inorganic materials. Other display technologies that may be utilized in embodiments include optical fiber technology, where a remote image is formed electronically and transmitted utilizing a light guiding source to fiber arrays or bundles. The remote image light source could be internal or external to the floor covering. Other contemplated display technologies include holographic displays. In this technique, either a white-light or laser hologram may generated either internally or externally to the floor covering 102, and focused by a lens, possibly a Fresnel lens, to make it visible to persons viewing the display 101 at an acute angle.

As noted above, the electronic display device 101 is capable of displaying at least alphanumeric data and graphic images. The content may include alphanumeric data alone, graphic images (e.g., pictures) alone, or combinations of the two, either static, moving, or both static and moving, in accordance with selected video content. Moving alphanumeric data and images may, for example, be scrolled. The alphanumeric data and graphic images could be black and white or in full color. Further, the display device 101 may include more than one distinct display: that is, the display area of the display device could be partitioned with respect to content. For example, the display area could include two or more different "windows," each displaying different content. Such a partitioning of displays is well known, for example, in "split-screen" TV and through the widespread use of various graphics software applications, including the ubiquitous "Windows" software by Microsoft®.

Various digital video file formats could be used to generate images on the electronic display device 101, including MPEG (Moving Picture Experts Group), DVD (digital versatile disc) or digital video disc, and Flash. Further, conventional video content used, for example, in network television, could be converted into digital video content for display on an electronic display device 101 according to embodiments of the present invention. One such converting process involves taking conventional NTSC (National Television Systems Committee) video from a tape, and capturing it on a computer through a video capture card. An example of this type of card is a Targa 2000 RTX board. Once captured, the video may be compressed into a file with a format that can be played by digital equipment. The file could be saved, by way of example only, in MPEG 1, MPEG 2, MPEG 3 or MPEG 4 formats.

According to embodiments, components of the floor display system 100 as described above could be housed completely internally to the floor covering 102, completely externally to the floor covering 102, or some components could be internal to the floor covering 102, while others are external.

Figure 2:
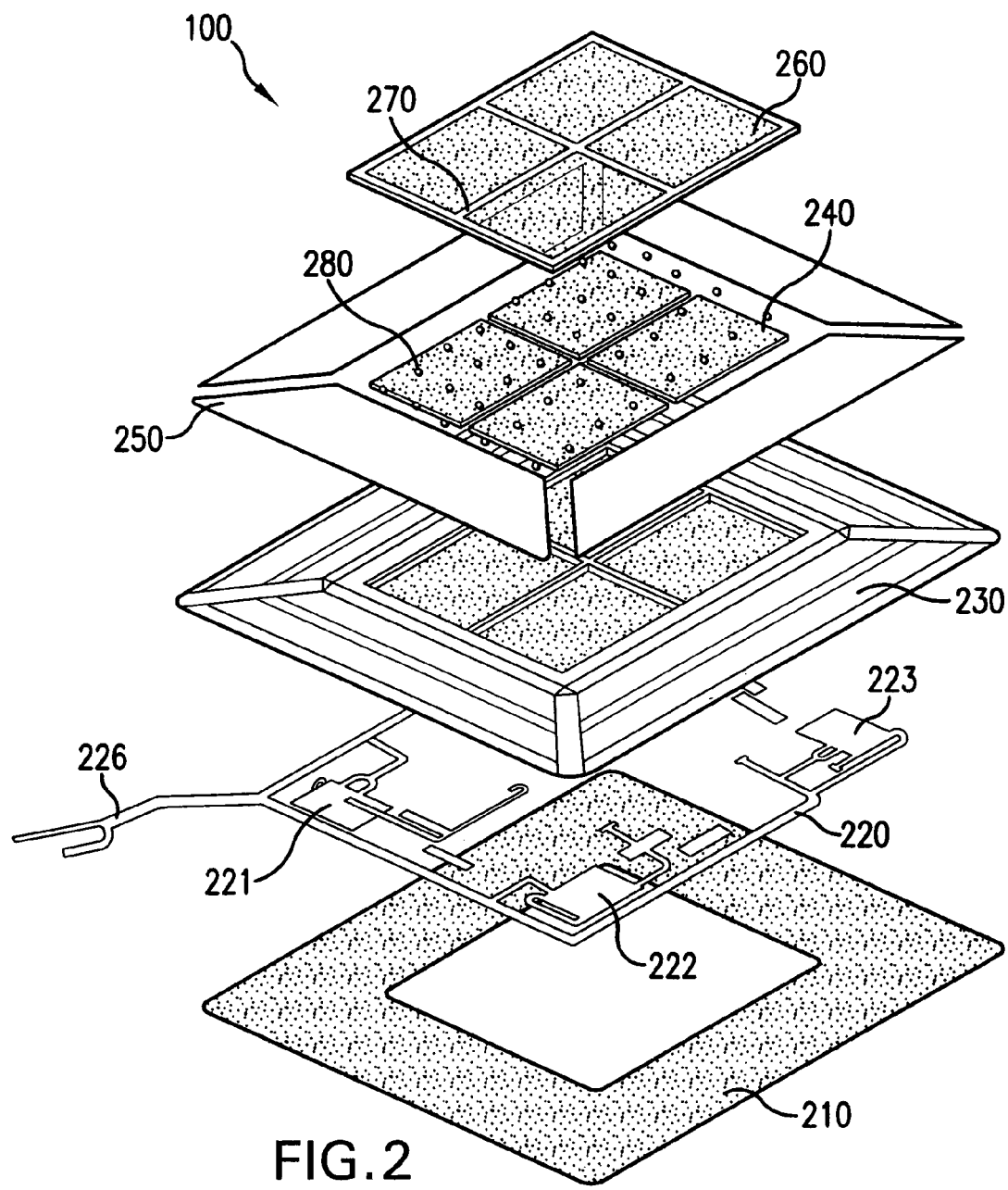
FIG. 2 shows an exploded view of a floor display system according to embodiments of the present invention.

FIG. 2 is an exploded view of the floor display system 100 according to possible embodiments. A base component 210 may be configured to receive and support a wiring assembly 220 comprising electronic inverters 221, 222, 223, and a fourth inverter not visible in FIG. 2, and associated power supply cables 226. The four electronic inverters may be used for providing power for driving a back light on each of, for example, four LCD displays in a four-panel electronic display device 240. A structure 230 may be arranged over the wiring assembly 220; structure 230 may be formed from plastic or other material and provide support for the inclined surfaces 131, 132, 133, 134 and for the display device 240. Sections of surfacing material 250, such as carpet or rubber, may be placed over structure 230, to form inclined surfaces 131, 132, 133, 134. A transparent member such as a plate of tempered glass 260 including support ribs 270 and further supported by structure 230 may be used as a protective covering for the display device 240. Components of the floor display system may be held together, for example, with adhesive, epoxy or mechanical fasteners. A controller (not shown) such as controller 103 (see FIG. 1) might be constructed to be small or thin enough to be held within the borders of the floor covering 102 and among the components shown in FIG. 2.

It should be understood that embodiments of the present invention are not limited to the components, or forms thereof, of the system illustrated in FIG. 2. For example, the transparent member 260 need not include support ribs, nor need the display device 240 include four panels; more or fewer panels are possible.

Figure 3:
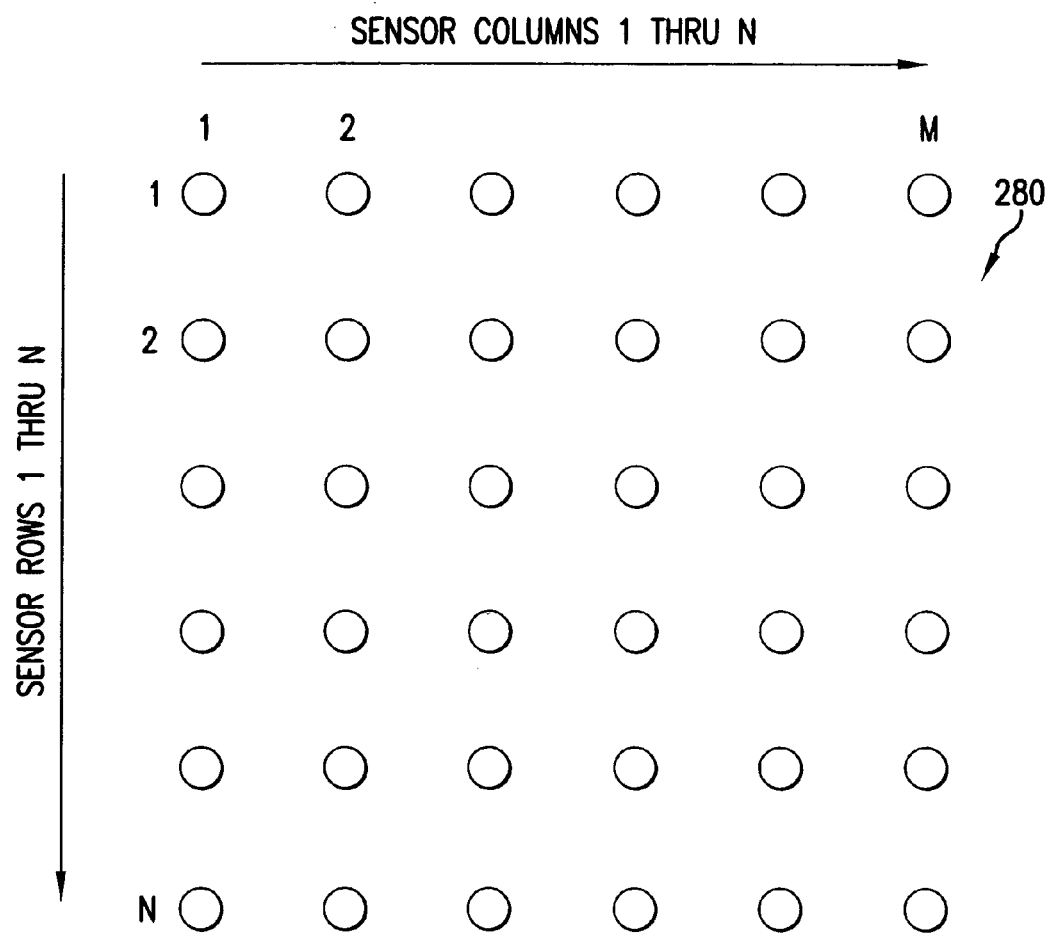
FIG. 3 shows an example of an array of sensing devices according to embodiments of the present invention.

According to embodiments of the present invention, a plurality of sensing devices 280 may be included in the floor display system 100. For example, the plurality of sensing devices could be arranged below the transparent member 260. Additionally or alternatively, the plurality of sensing devices could arranged above, in or on the transparent member 260. FIG. 3 shows a plan view of the sensing devices 280. The sensing devices may be arranged, by way of example only, in an array comprising N rows and M columns. In embodiments, the array could be a square array where N=M.

Each sensing device could be associated with a particular location on the display device 240. For example, each sensing device could be identified by a coordinate pair, such as (3, 2), identifying the sensing device in the third row and second column. Each coordinate pair would further correspond to a location on a display area of the display device 240. Based on a signal generated by a sensing device(s), a corresponding display area of the display device could be caused to display a desired content. For example, a previous content could be modified and/or new content generated based on a signal from a sensing device. More specifically, the sensing devices 280 could be coupled to the controller 103. Based on signals received from a sensing device(s), the controller could execute logic to cause desired content to be displayed at a location or locations on a display area of the display device corresponding to the sensing device(s) from which signals are received.

The sensing devices could, in particular, be capable of sensing the presence of an object on, near or above the display device. To this end, the sensing devices 280 could include, by way of example only, devices responsive to light. These include any or all of photo detectors, photo diodes, and photo transistors. Such devices are responsive to a change in an amount of ambient light, and may be made to generate corresponding output signals in response to a decrease or increase in the amount of ambient light. These signals may be input to a controller as described above. Thus, the floor display system 100 could be configured to generate content at specific locations in response to a person stepping on or walking across the floor display system by causing sensing devices corresponding to the specific locations to generate signals in response to the stepping or walking. More specifically, because the stepping or walking will block light input to the sensing devices, the sensing devices will register a decrease in light and may be caused to generate corresponding signals to the controller. Based on the signals, the controller may generate desired content at locations corresponding to the sensing devices that generate the signals. The content, for example, could be an eye-catching image such as ripples that track the movement of a person's feet. Objects that could be tracked by the sensing devices, however, are not limited to feet. For example, an object such as a ball could be rolled across the floor display system, and a series of images generated in response that shows the path of the ball.

Pressure-sensing devices or temperature-sensing devices could also be used to detect and track objects on the floor display system using operations similar to the operations involving the light-responsive devices as described above. The pressure-sensing devices, temperature-sensing devices and light-responsive devices could each be used solely or in combination with one or more other types of sensing devices. While the sensing devices may be arranged below the transparent member, they need not be. They could be on an upper surface of the transparent member or embedded within the transparent member. For example, the transparent member could be machined or fabricated to receive a sensing device array therein in such a way that the sensing device array is protected but can sense changes in light and/or pressure and/or temperature.

In embodiments, the light-responsive devices could be passive devices that receive light energy from ambient light and register changes in the amount of light energy received. A baseline level of light energy may be determined based on an average of light energy received by a plurality of sensing devices, and all of the plurality of sensing devices may be calibrated based on this baseline level. On the other hand, individual sensing devices could be calibrated based on different respective baseline light energy levels. The sensing devices could be calibrated so when there was a change in the baseline level of light energy, for example due to some object blocking incident light energy, they would output a signal that is received by the controller. In response, the controller could cause desired content to be displayed. To discourage spurious signals from the sensing devices, the sensing devices could be arranged in a recess to ensure that most incident light energy is received from a desired direction. In alternative embodiments, the sensing devices could be active sensing devices that emit electromagnetic energy such as light or other radiation, and generate signals based on whether the emitted light energy is reflected or interrupted. Embodiments could include both passive and active sensing devices.

Figure 4:
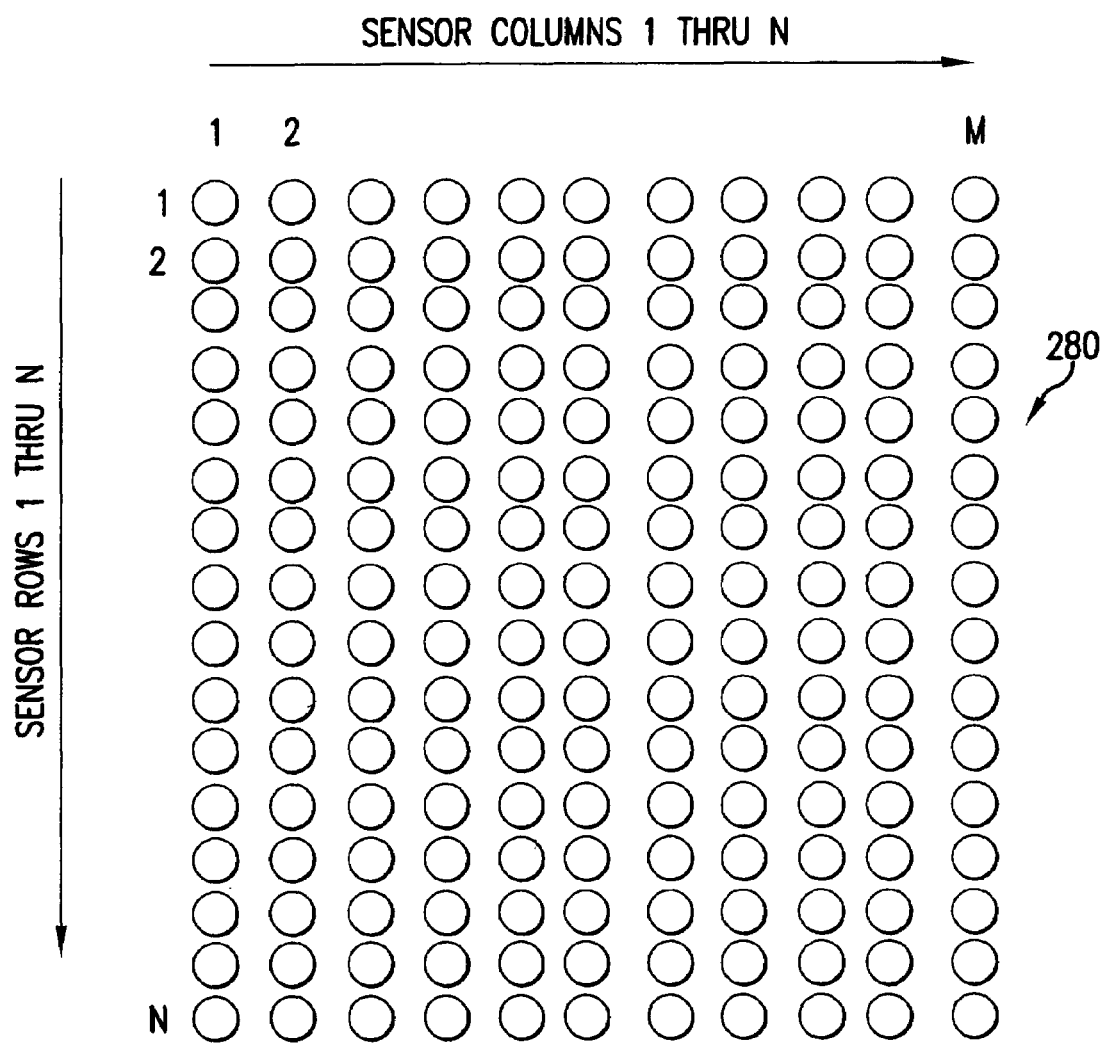
FIG. 4 shows another example of an array of sensing devices according to embodiments of the present invention.

The sensing devices could be arranged in any desired way, and need not form a regular pattern. For example, the sensing devices could be spaced to achieve a desired resolution. To detect comparatively small objects on or near the floor display system, the sensing devices could be comparatively close together and comparatively more numerous to yield a comparatively fine resolution. On the other hand, to detect comparatively large objects, the sensing devices could be comparatively far apart and comparatively less numerous to yield a comparatively coarse resolution. In a given floor display system, there could be an arrangement of sensing devices in a mixture of comparatively fine resolution and comparatively coarse resolution. FIG. 4 shows an example of a sensing device array with finer resolution than the array in FIG. 3. In embodiments, sensing devices could be arranged with a comparatively fine resolution on or near the edges of a floor display system. Such an arrangement could be effective to produce eye-catching effects, such as a display of a ripple in a pool of water beginning as a person's shoe approaches an edge of the floor display system and conforming to the shape of the shoe near the edge.

Figure 5:
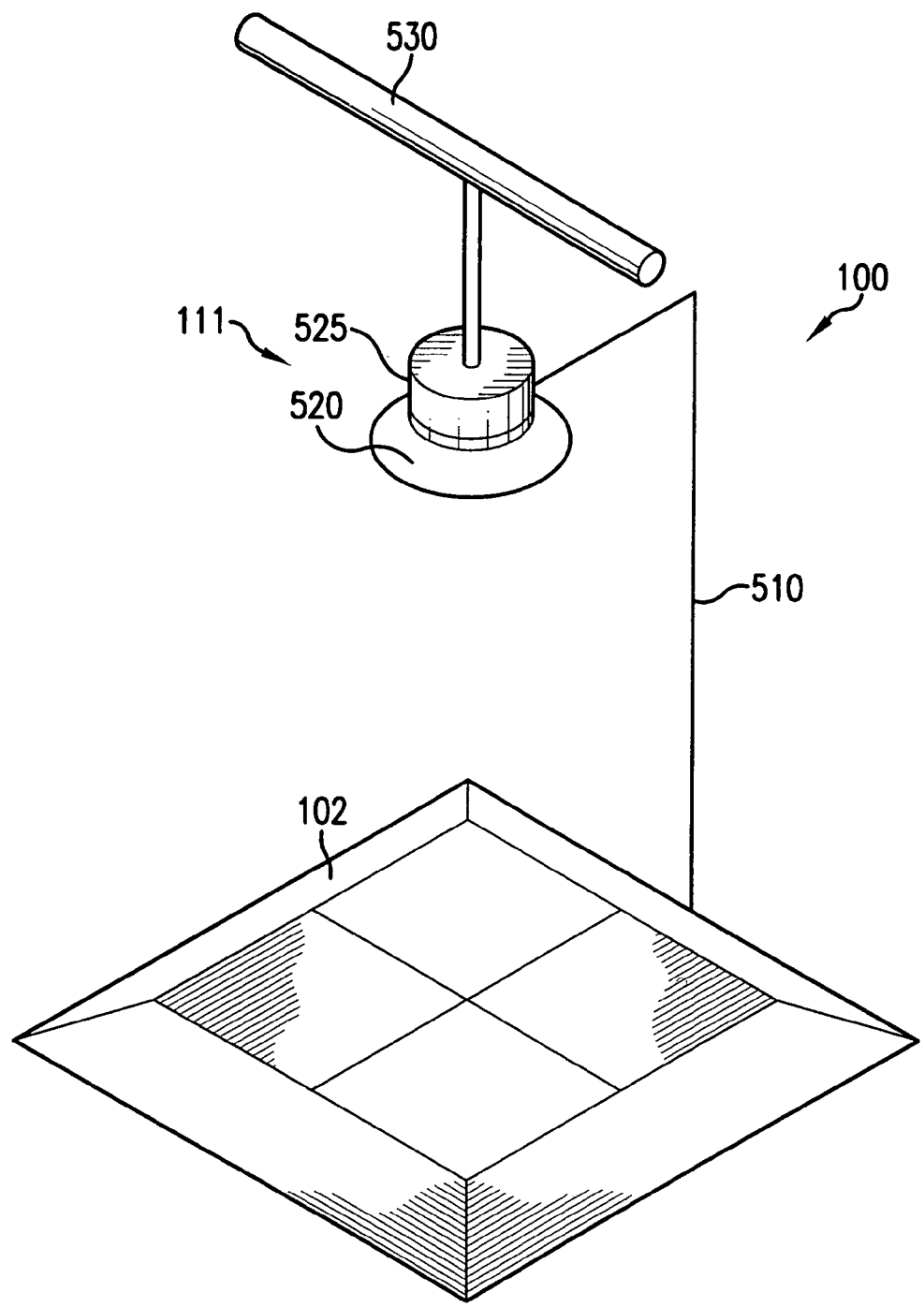
FIGS. 5 and 6 show a floor display system including an audio device according to embodiments of the present invention.
Figure 6:
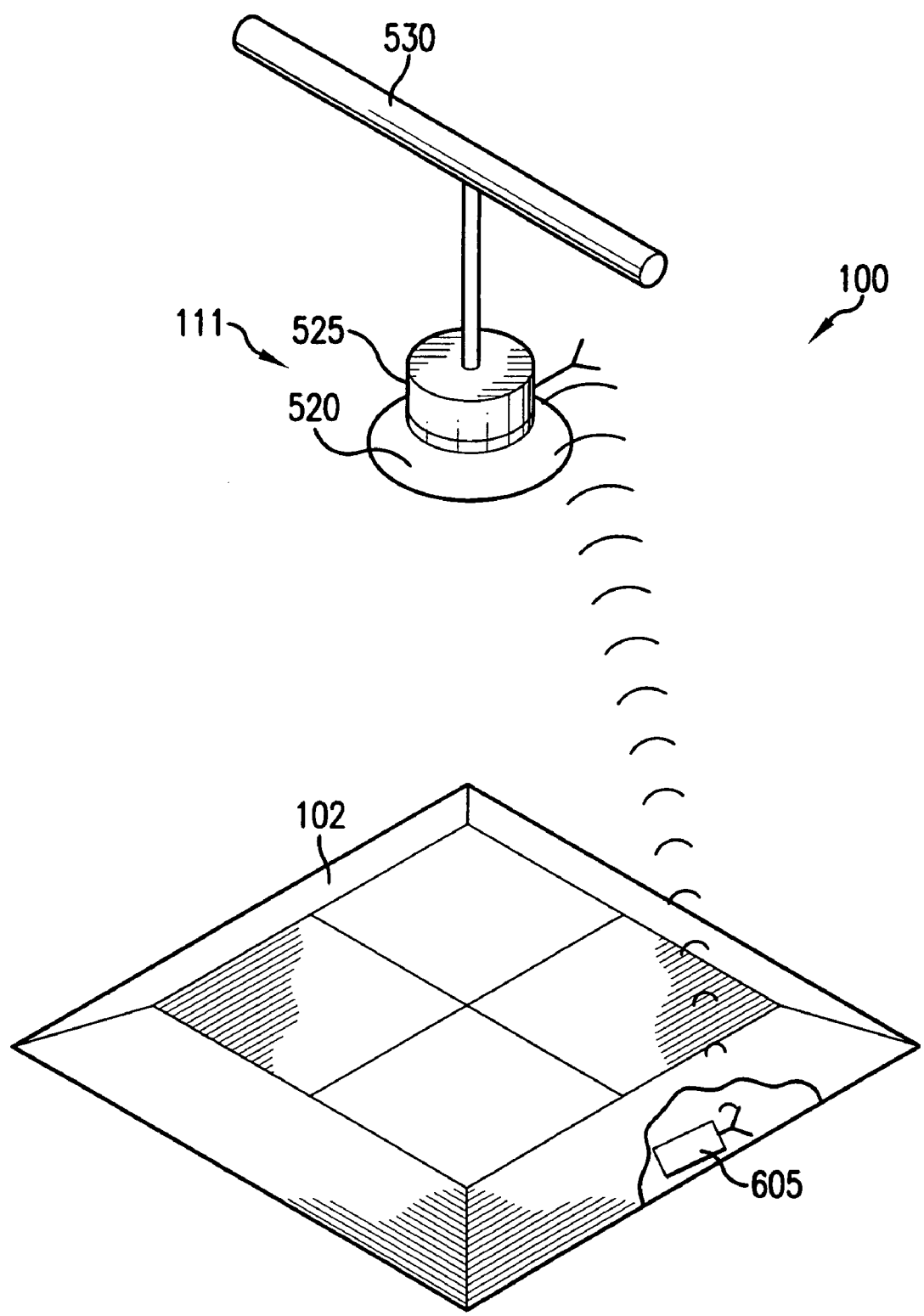

As noted with reference to FIG. 1, the floor display system 100 may include an audio device 111. FIG. 5 shows an embodiment of the present invention wherein the audio device 111 is suspended by a support 530 above or otherwise in the vicinity of the floor display system. The audio device 111 may include a loudspeaker 520 and a receiver 525. The audio device may be coupled by a wired connection 510 to the controller 103 of the floor display system 100. The audio device may include an amplifier (not shown) to amplify signals received from the controller via the wired connection. The audio device may be configured to generate audio output under the control of the controller in response to signals generated by sensing devices in the floor display system as described above. According to embodiments, the speaker 520 could be a directional speaker such as the Dual-Parabolic™ speakers produced by Soundtube™. Use of such a directional speaker could enable sound to be confined to a desired area. The controller 103 could control the volume and frequency range of the output of the speaker to minimize the effect of reflected sound. As shown in FIG. 6, in embodiments the controller 103 could be coupled to the audio device 111 wirelessly via transmissions from a transmitter 605 of the floor display system. The transmitter 605 could be, for example, arranged below a surface of the floor covering 102. An amplifier of the audio device may amplify a signal received from the transmitter.

Figure 7A:
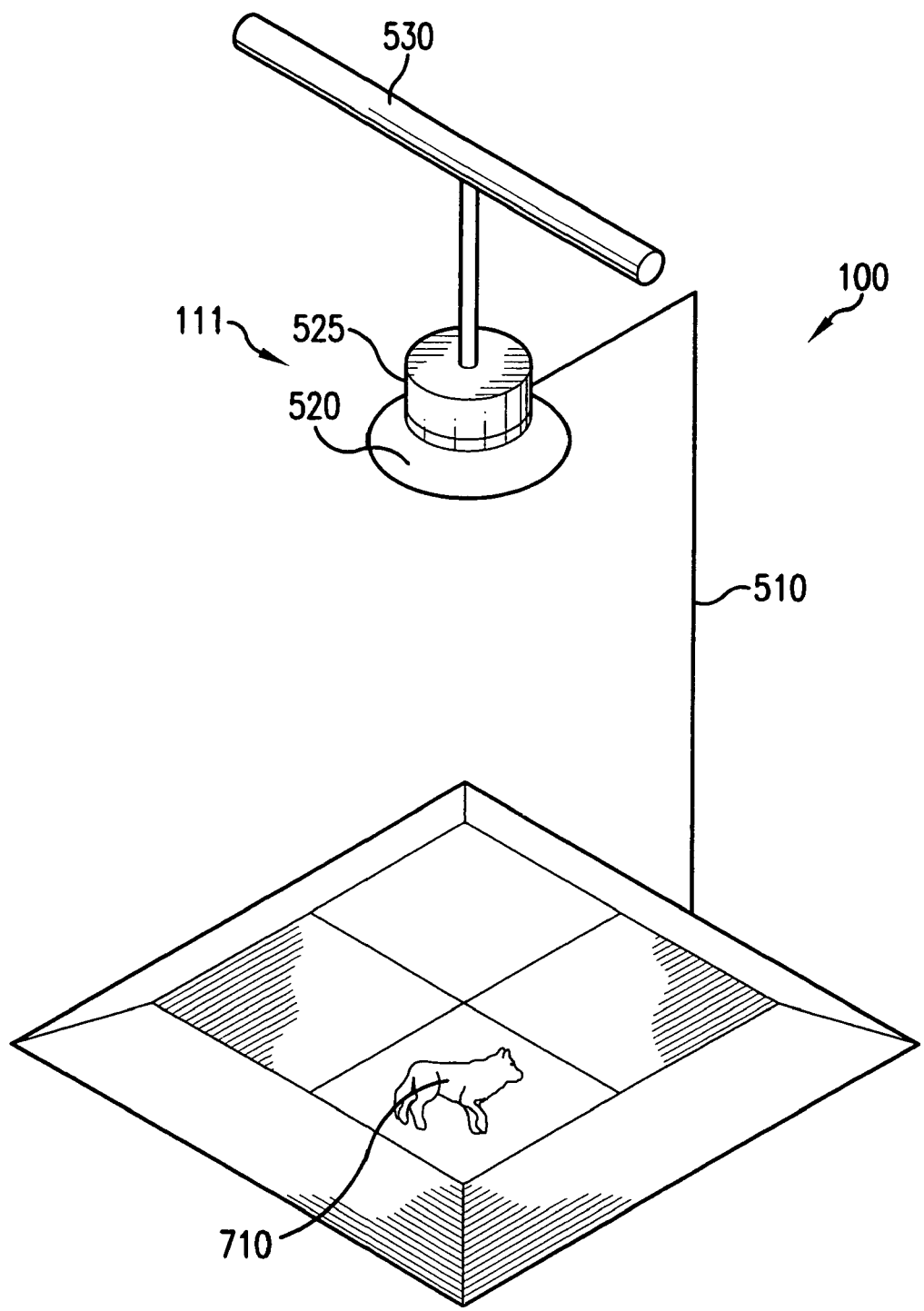
FIGS. 7A–7C show an example of an operation of a floor display system according to embodiments of the present invention.
Figure 7B:
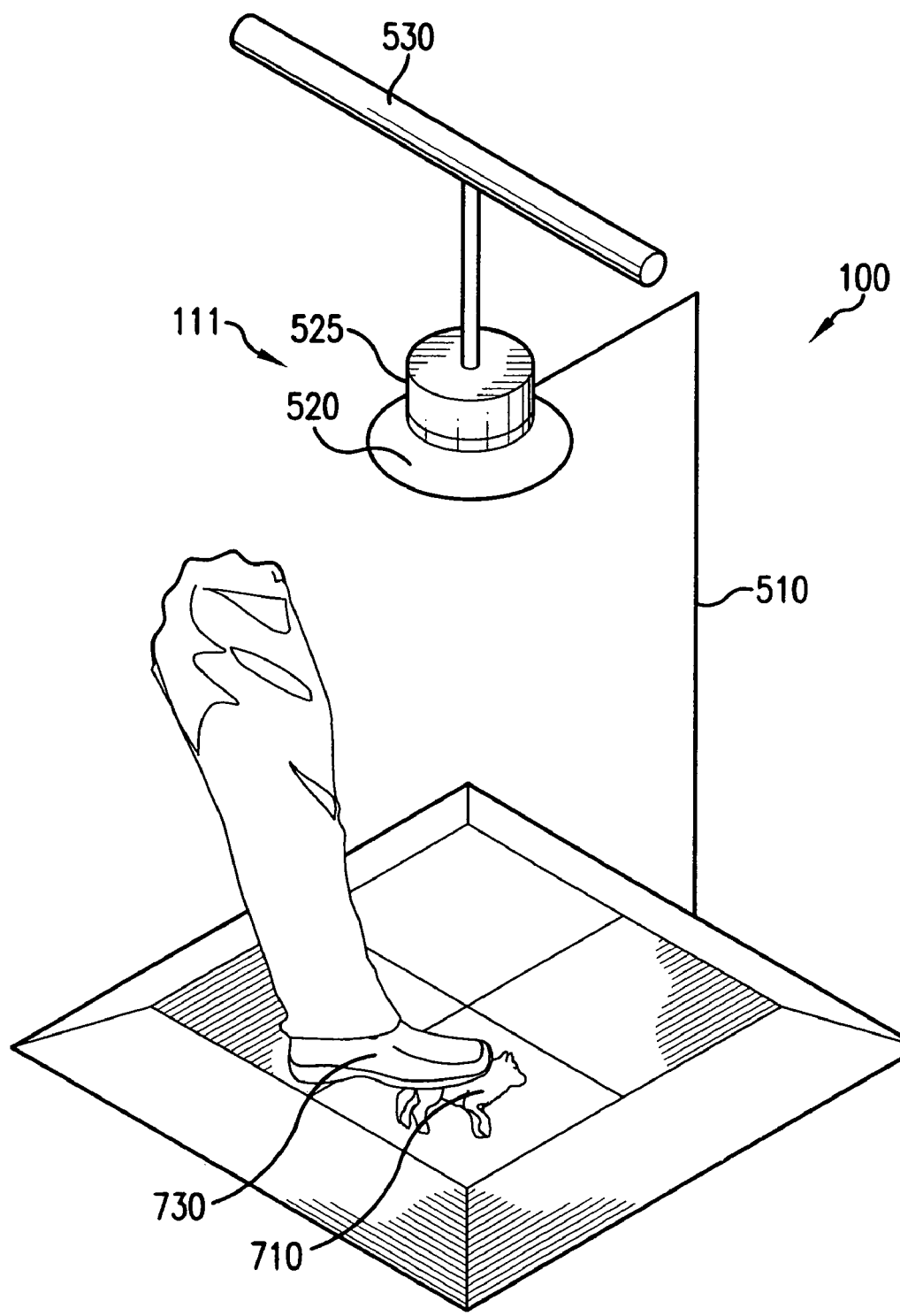
Figure 7C:
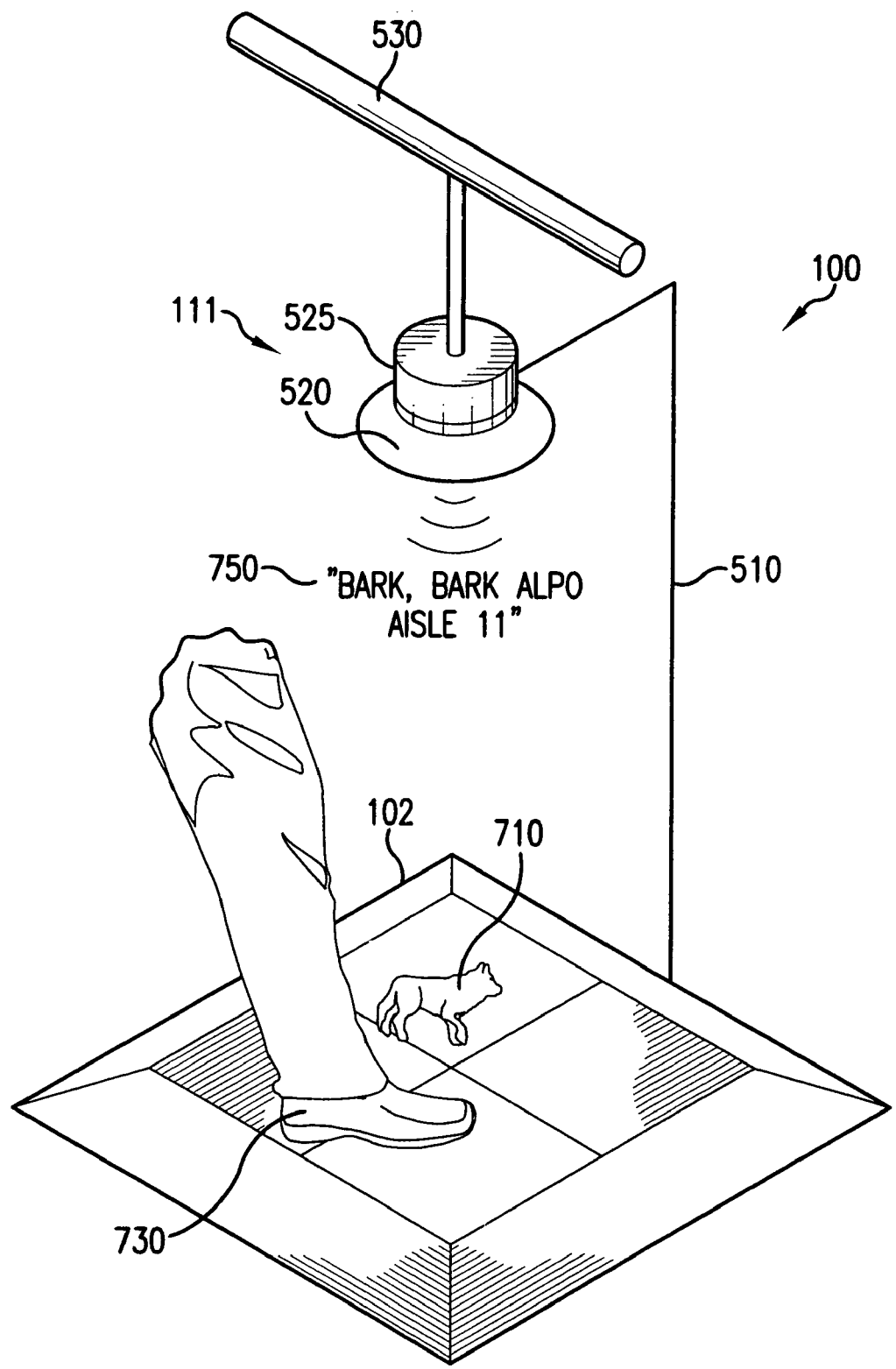

The audio device could be configured to generate audio output corresponding to a display of the floor display system. An example is shown in FIGS. 7A–7C. In FIG. 7A, an image 710 of a dog is displayed on the floor display system. In response to a person's foot 730 stepping on or passing over the image of the dog as shown in FIG. 7B, the audio device might, for example, be caused to emit a barking sound. In combination with the barking sound, the image of the dog might be caused to appear to run to another location on the display of the floor display system, as shown in FIG. 7C. A related audio output 750 such as an advertising message could further be emitted by the audio device as shown in FIG. 7C. For example, along with the barking sound, a location of dog food in a store could be announced, as in "ALPO—aisle 11".

Figure 8:
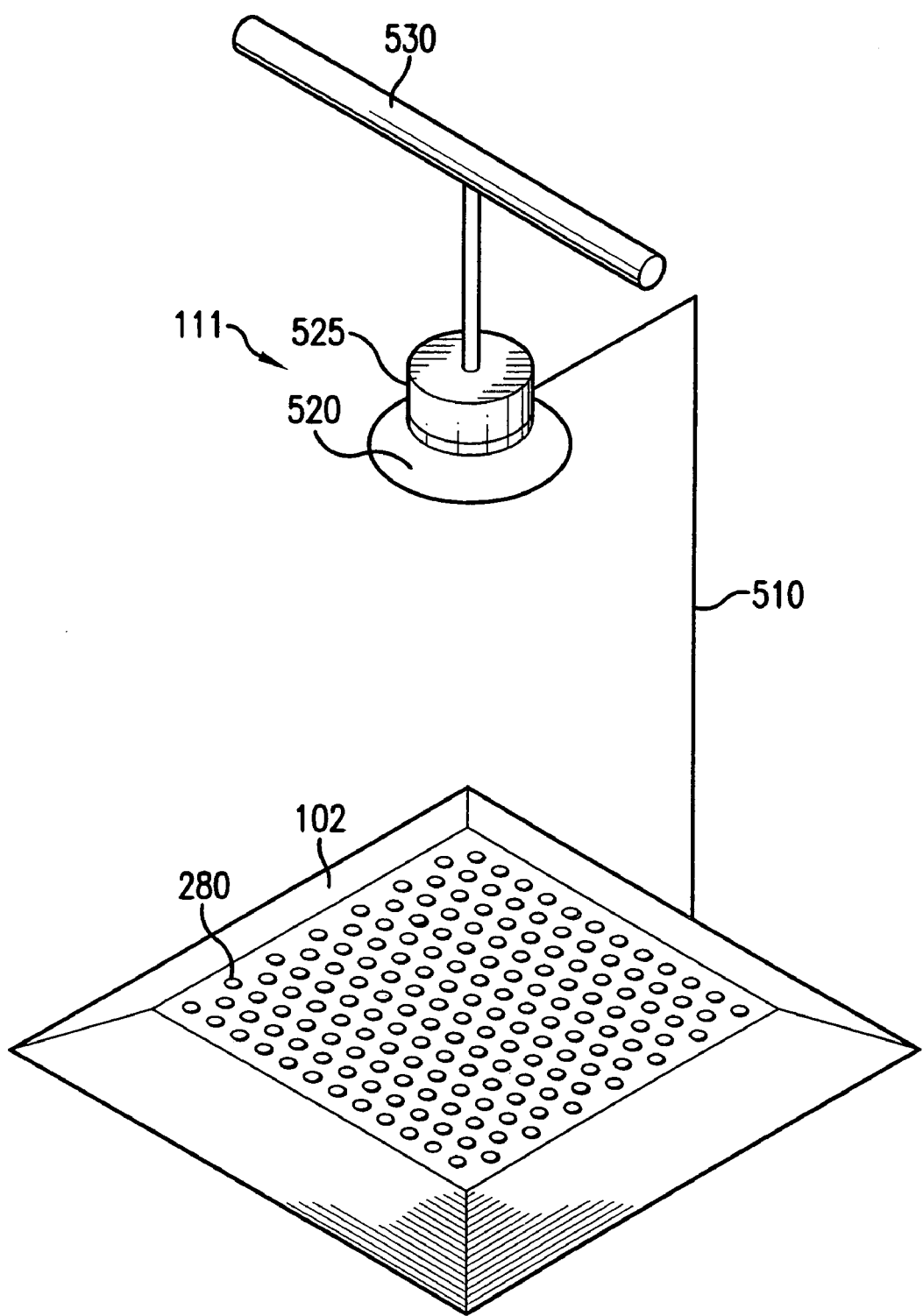
FIG. 8 shows a floor display system according to embodiments of the present invention wherein a transparent member thereof does not include support ribs.

FIG. 8 shows an embodiment of the floor display system comprising an array of sensing devices 280 wherein the transparent member does not include support ribs.

Figure 9:
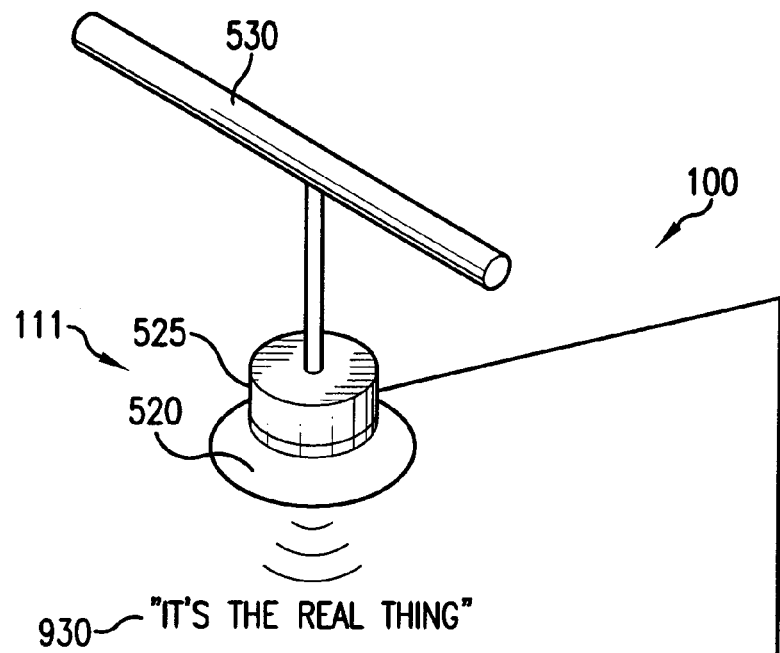
FIG. 9 shows a floor display system including a substantially vertical or inclined display device according to embodiments of the present invention.
Figure 9:
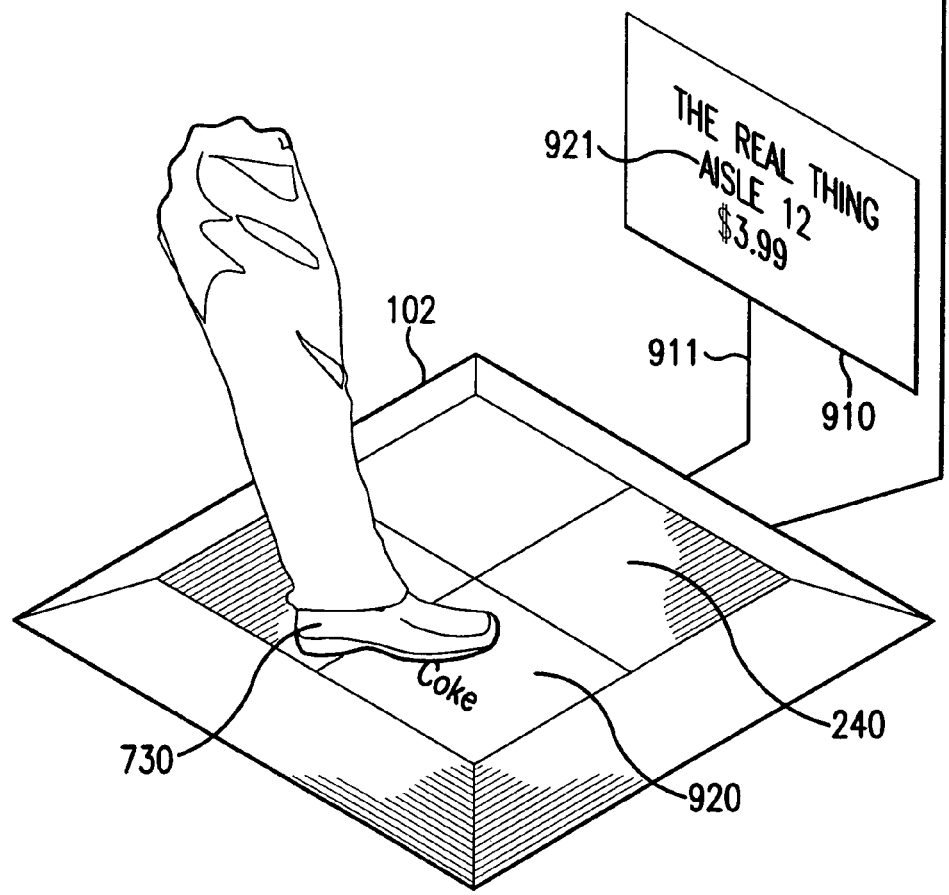

In still further embodiments of the present invention, the floor display system 100 may comprise a display that is substantially vertical or inclined. An example is shown in FIG. 9. In FIG. 9, a substantially vertical or inclined display device 910 is included with the floor display system 100. For example, the substantially vertical or inclined display device 910 could be an electronic device coupled by a wired connection 911 or wirelessly (not shown) to the controller of the floor display system. The substantially vertical or inclined display device 910 could incorporate any of the display technologies disclosed herein or otherwise suitable. The substantially vertical or inclined display device 910 could, for example, be a projection device that projects an image onto a surface from distance.

Under the control of the controller, the substantially vertical or inclined display device 910 could be caused to generate content relating to content displayed on the electronic display device 240 associated with the floor covering 102 of the floor display system 100. In the example of FIG. 9, in response to a person's foot 730 stepping on or passing over the floor covering 102 of the floor display system, the controller causes the display device 240 associated with the floor covering 102 to generate an advertising message 920 ("Coke™") in a corresponding location and causes the substantially vertical or inclined display device 910 to generate a display of a related advertising message 921 ("The Real Thing™") and a store location and price of the advertised product ("Aisle 12—$3.99"). The audio device 111 is caused to generate a related audio message 930 ("It's the real thing™").

Product Identification/Location Feature

Figure 10:
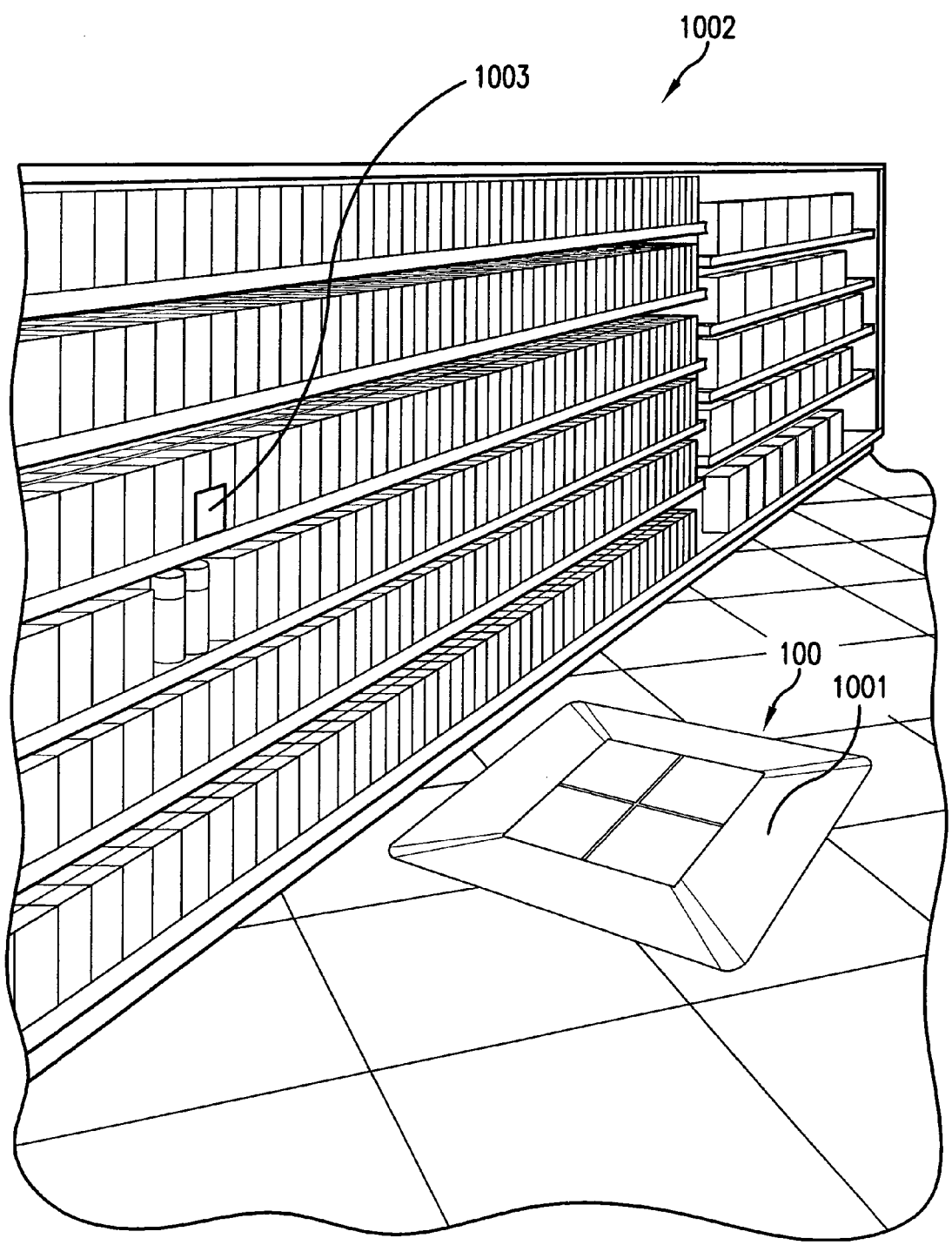
FIG. 10 shows a floor display system including a signaling device according to embodiments of the present invention.

In applications of the floor display system according to embodiments of the present invention, a product being promoted on the floor display system may be located in a store among a number of similar products, making the product being promoted difficult to find. An example is shown in FIG. 10. In FIG. 10, a floor display system 100 is arranged in front of a row of shelves 1002. The shelves hold a variety of different brands of hair care products. The floor display system 100 is displaying an advertising message 1001 promoting one particular brand of the hair care products on the shelves. Because the shelves hold an array of similar hair care products extending many feet, the particular product being promoted may be difficult to find.

Accordingly, in still further embodiments of the present invention, the floor display system 100 may comprise a product identification/location feature. This feature could be very helpful in allowing a consumer to quickly locate a product being promoted on the floor display system. Referring to FIG. 10, the product identification/location feature may comprise a signaling device 1003 (not shown to scale) arranged near a product being promoted on the floor display system. The controller 103 (see FIG. 1) of the floor display system may communicate with the signaling device 1003. Under the control of the controller, the signaling device may be caused to emit a signal when a particular product is being promoted on the floor display system. The signal could be visible, audible or olfactory, or any combination of these. For example, when a particular product is being promoted, the signaling device could be caused to blink or flash a light, emit a sound, emit a fragrance, or perform any combination of these. Such signals would enable a consumer to easily and quickly locate the product being promoted.

Figure 11:
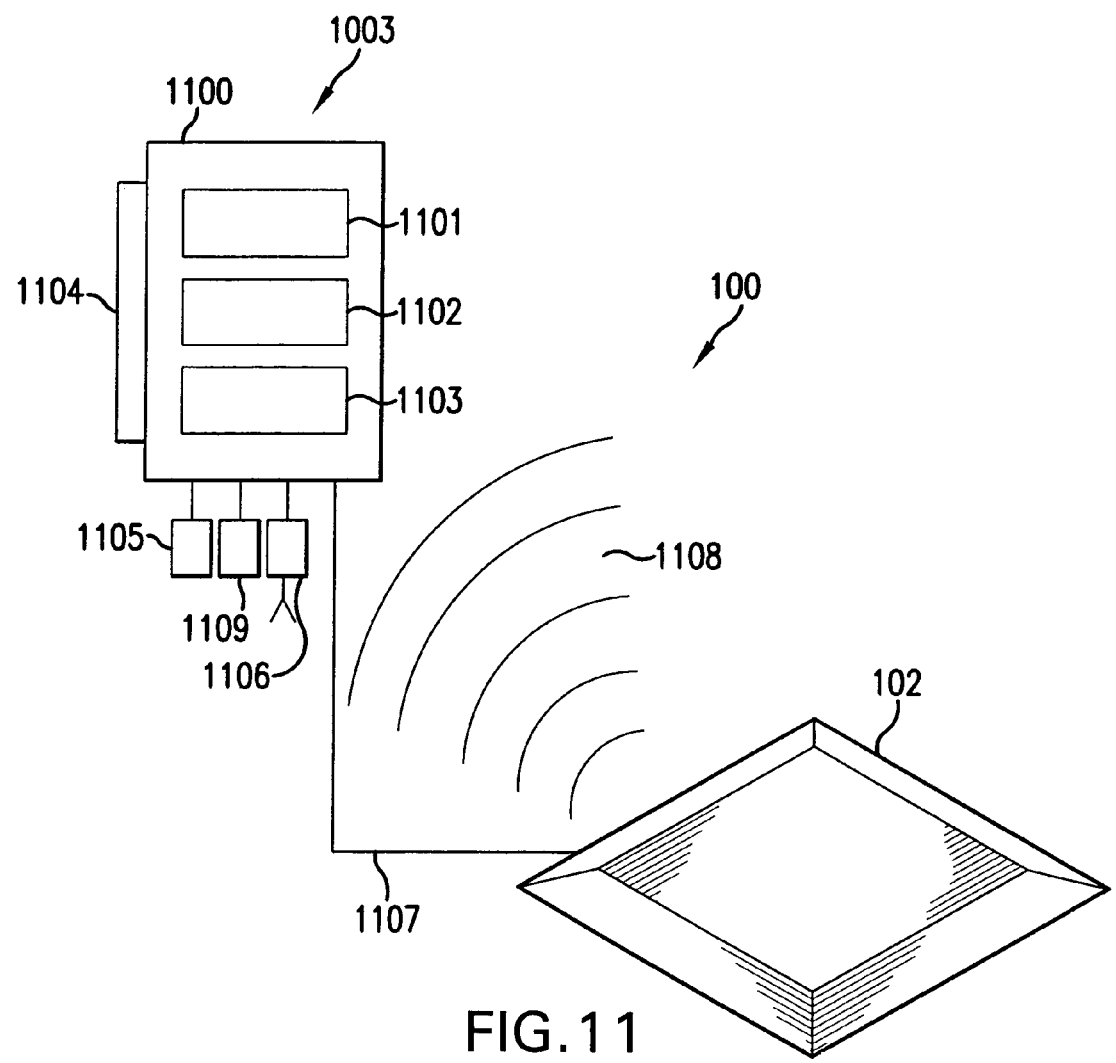
FIG. 11 shows further details of the signaling device according to embodiments of the present invention.

A signaling device 1003 for product identification/location according to embodiments of the present invention is further illustrated in FIG. 11. The signaling device 1003 may comprise a light source 1101, a sound source 1102, and a fragrance source 1103. However, the signaling device 1003 need not include all of these and may include only a light source, only a sound source, or only a fragrance source. Or, the signaling device could include any desired combination of a light source, a sound source, and a fragrance source. Any of the light source, the sound source or the fragrance source, or combination thereof, may have associated therewith a housing 1100. The housing 1100 could be designed so that the signaling device 1003 could be free-standing. Additionally or alternatively, the housing could have a fastening device 1104 associated therewith. The fastening device 1104 could be part of the housing or an independent part affixed to the housing. The fastening device 1104 could include, for example, hooks, snaps, adhesive, magnets, a hook-and-loop arrangement such as Velcro™, or any other suitable fastening arrangement. The signaling device 1003 may further include an independent power source 1105, such as a battery, but could receive power from the floor display system or other source.

The signaling device 1003 may be coupled by a wired connection 1107 or a wireless connection 1108 to the floor display system 100 and receive control signals from the controller 103 via the wired connection 1107 or wireless connection 1108. To receive wireless signals, the signaling device could include a transceiver 1106. The signaling device could further include its own logic device 1109, such as a microprocessor, that could be programmed to execute processes independently of the control of the controller 103. For example, the controller 103 might simply send an initiating signal to the signaling device 1003 to cause it to initiate some sequence of light flashes, or of sounds, or of fragrance emissions, or of any combination of these, under the control of logic device 1109.

Again, the signaling device 1003 may be used for product identification/location. For example, the signaling device could be arranged on a shelf near a product being promoted, either free-standing or affixed by the fastening device 1104 to the shelf or other support. When the floor display system is generating a particular display to promote the particular product, it may send a corresponding signal to the signaling device 1003. In response, the signaling device may generate a visible display, such as a continuous light or a sequence of light blinks or flashes, emit a sound such as a tone or buzz or product jingle, emit a fragrance, or any combination of the foregoing.

The floor display system could be caused to generate the particular display promoting the particular product based on signals generated by an array of sensors 280 arranged in, on or below the transparent member 240 as described above. Additionally or alternatively, the floor display system could be caused to generate the particular display promoting the particular product based on the detection of merely the proximity of a person to, as opposed to a person actually stepping or walking on, the floor display system. Such detection could be performed by sensing device 113 (see FIG. 1). Sensing device 113 may take on a number of varying forms, each of which enables the detection of phenomena or activities indicating the presence of persons in the vicinity of the floor display system, and causes the floor display system to perform some corresponding action in response. The corresponding action may be generating a display promoting a particular product, and as a result, activating the signaling device 1003 as described above. In one such embodiment, the sensing device 113 is a sound-sensing device. Examples of sound-sensing devices include omni-directional and directional microphones. The sound-sensing device 113 may be located within the floor covering 102 (see FIG. 1), or may be located at some distance from the floor covering. The sound-sensing device could be configured to detect an individual as he or she approached the floor display system, and to cause a corresponding response to be generated by the floor display system.

In yet another embodiment, sensing device 113 may be a motion-detection device. Examples of motion-detection devices include devices that detect light, temperature or pressure changes as discussed above, and devices that detect motion by injecting energy (e.g., light, microwaves or sound) into the environment, and then detecting a change in the energy. The motion-detection device 113 could be located within the floor covering 102, or may be located at some distance from the floor covering, for example, in or on a ceiling or wall near the floor covering. The motion-detection device could be configured to detect an individual as he or she approached the floor display system, and to cause a corresponding response to be generated.

The floor display system according to embodiments of the present invention may also detect the presence or movement of a person based on events within the physical environment. For example, the floor display system could be coupled via a wired or wireless connection to a door in an entry way or other door of a commercial establishment or other building. Through the connection, the floor display system could detect the opening of the door, and activate the display in response.

In embodiments, the floor display system could be arranged, for example, in the "raceway" of a commercial establishment. A raceway is a common area at ends of a plurality of aisles (e.g., in a common layout of grocery stores, the raceway is between the checkout counters and the aisle ends). A signaling device or devices could be arranged down the aisles and visible from the raceway to indicate the location of a product being promoted on the floor display system.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A floor display system, comprising:
a floor covering for placement on a floor and comprising at least one inclined surface that slopes downward and away from a top surface of the floor covering to the floor;
an electronic display device associated with the floor covering and in a plane substantially parallel to the floor, wherein the electronic display device is to display electronically modifiable arbitrary content, wherein the floor covering is adapted to at least partially support the position of the electronic display device;
a controller; and
a sensing device coupled to the controller, wherein the sensing device is associated with a specific location on the display device and is to generate a signal to the controller to cause a content of a display of the display device to be modified or newly generated at the specific location.

2. The floor display system of claim 1, wherein the sensing device is responsive to light.

3. The floor display system of claim 2, wherein the sensing device generates the signal based on detecting a change in an amount of light.

4. The floor display system of claim 2, wherein the sensing device includes a photo diode.

5. The floor display system of claim 2, wherein the sensing device includes a photo detector.

6. The floor display system of claim 2, wherein the sensing device includes a photo transistor.

7. The floor display system of claim 2, wherein the sensing device is arranged within a recess.

8. The floor display system of claim 2, wherein the sensing device is a passive device.

9. The floor display system of claim 2, wherein the sensing device is an active device.

10. The floor display system of claim 1, wherein the sensing device is responsive to pressure.

11. The floor display system of claim 10, wherein the sensing device generates the signal based on detecting a change in pressure.

12. The floor display system of claim 1, wherein the sensing device is responsive to temperature.

13. The floor display system of claim 12, wherein the sensing device generates the signal based on detecting a change in temperature.

14. The floor display system of claim 1, further comprising a plurality of the sensing devices.

15. The floor display system of claim 14, wherein the sensing devices are arranged in an array comprising rows and columns.

16. The floor display system of claim 14, wherein the sensing devices are arranged below a transparent member of the floor display system.

17. The floor display system of claim 1, further comprising an audio device to generate an audio output relating to content displayed on the display device.

18. The floor display system of claim 17, wherein the audio device includes a directional speaker.

19. The floor display system of claim 1, further comprising a substantially vertical or inclined display device.

20. The floor display system of claim 19, wherein the substantially vertical or inclined display device generates a display with alphanumeric data or a graphic image relating to alphanumeric data or a graphic image of a display of the electronic display device associated with the floor covering.

21. The floor display system of claim 19, wherein the substantially vertical or inclined display device includes a projection device.

22. The floor display system of claim 1, wherein the electronic display device includes a nanocarbon display.

23. A floor display system, comprising:
a floor covering for placement on a floor and comprising at least one inclined surface that slopes downward and away from a top surface of the floor covering to the floor;
an electronic display device associated with the floor covering and in a plane substantially parallel to the floor, wherein the electronic display device is to display electronically modifiable arbitrary content, wherein the floor covering is adapted to at least partially support the position of the electronic display device;
a controller; and a plurality of sensing devices coupled to the controller to generate an image on the electronic display device that tracks the movement of an object.

24. The floor display system of claim 23, wherein each sensing device is associated with a specific location on the display device and is to generate a respective signal to the controller to cause alphanumeric data or a graphic image of a display of the display device to be modified or newly generated at a respective specific location.

25. A floor display system, comprising:
a floor covering for placement on a floor and comprising at least one inclined surface that slopes downward and away from a top surface of the floor covering to the floor;
an electronic display device associated with the floor covering and in a plane substantially parallel to the floor, wherein the electronic display device is to display electronically modifiable arbitrary content, wherein the floor covering is adapted to at least partially support the position of the electronic display device;
a controller; and
a signaling device coupled to the controller to emit a signal corresponding to a display content of the electronic display device.

26. The floor display system of claim 25, wherein the signal comprises a light.

27. The floor display system of claim 25, wherein the signal comprises a sound.

28. The floor display system of claim 25, wherein the signal comprises an olfactory stimulus.

29. The floor display system of claim 25, wherein the signaling device is free-standing.

30. The floor display system of claim 25, wherein the signaling device comprises a fastening device to fasten the signaling device to a support.

31. The floor display system of claim 25, wherein the signaling device is coupled by a wired connection to the controller.

32. The floor display system of claim 25, wherein the signaling device is coupled by a wireless connection to the controller.

33. The floor display system of claim 25, wherein the floor display system generates the display and the signaling device generates a corresponding signal in response to the detection of a proximity of a person.

34. A method comprising:
(a) arranging a floor display system in a commercial establishment;
(b) displaying content on the floor display system, the content relating to a promotion or advertisement of a product in the commercial establishment, and the content comprising an electronically modifiable verbal message;
(c) arranging a signaling device coupled to the floor display system near the product; and
(d) causing the signaling device to emit a signal in response to step (b).

35. The method of claim 34, wherein the signal comprises a light.

36. The method of claim 34, wherein the signal comprises a sound.

37. The method of claim 34, wherein the signal comprises an olfactory stimulus.

38. The method of claim 34, wherein the floor display system displays the content and the signaling device emits a corresponding signal in response to a detection of a proximity of a person.

39. The method of claim 34, wherein the floor display system is arranged in a common area of the commercial establishment.

40. A floor display system, comprising:
a floor covering for placement on a floor;
an electronic display device associated with the floor covering and in a plane substantially parallel to the floor, wherein the electronic display device is to display electronically modifiable arbitrary content, wherein the floor covering is adapted to at least partially support the position of the electronic display device;
a controller; and
a sensing device coupled to the controller, wherein the sensing device is associated with a specific location on the display device and is to generate a signal to the controller to cause a content of a display of the display device to be modified or newly generated at the specific location, and wherein the sensing device is responsive to light.

41. The floor display system of claim 40, wherein the sensing device generates the signal based on detecting a change in an amount of light.

42. The floor display system of claim 40, wherein the sensing device includes a photo diode.

43. The floor display system of claim 40, wherein the sensing device includes a photo detector.

44. The floor display system of claim 40, wherein the sensing device includes a photo transistor.

45. The floor display system of claim 40, wherein the sensing device is arranged within a recess.

46. The floor display system of claim 40, wherein the sensing device is a passive device.

47. The floor display system of claim 40, wherein the sensing device is an active device.

48. The floor display system of claim 40, wherein the floor covering defines a top surface adapted to support foot traffic thereon, wherein the electronic display device defines a top surface, and wherein the floor covering is further adapted to at least partially support the position of the top surface of the electronic display device in a plane substantially parallel to the top surface of the floor covering.

49. A floor display system, comprising:
a floor covering for placement on a floor;
an electronic display device associated with the floor covering and in a plane substantially parallel to the floor, wherein the electronic display device is to display electronically modifiable arbitrary content, wherein the floor covering is adapted to at least partially support the position of the electronic display device;
a controller; and
a plurality of sensing devices coupled to the controller, wherein the sensing devices are associated with specific locations on the display device and are to generate signals to the controller to cause a content of a display of the display device to be modified or newly generated at the specific locations.

50. The floor display system of claim 49, wherein the sensing devices are arranged in an array comprising rows and columns.

51. The floor display system of claim 49, wherein the sensing devices are arranged below a transparent member of the floor display system.

52. A floor display system, comprising:
a floor covering for placement on a floor;
an electronic display device associated with the floor covering and in a plane substantially parallel to the floor, wherein the electronic display device is to display electronically modifiable arbitrary content, wherein the floor covering is adapted to at least partially support the position of the electronic display device;

a controller;

a sensing device coupled to the controller, wherein the sensing device is associated with a specific location on the display device and is to generate a signal to the controller to cause a content of a display of the display device to be modified or newly generated at the specific location; and a substantially vertical or inclined display device.

53. The floor display system of claim 52, wherein the substantially vertical or inclined display device generates a display with alphanumeric data or a graphic image relating to alphanumeric data or a graphic image of a display of the electronic display device associated with the floor covering.

54. The floor display system of claim 52, wherein the substantially vertical or inclined display device includes a projection device.

* * * * *